April 28, 1959  A. E. ROY  2,884,094
CHECKSTAND
Filed July 31, 1956  6 Sheets-Sheet 3
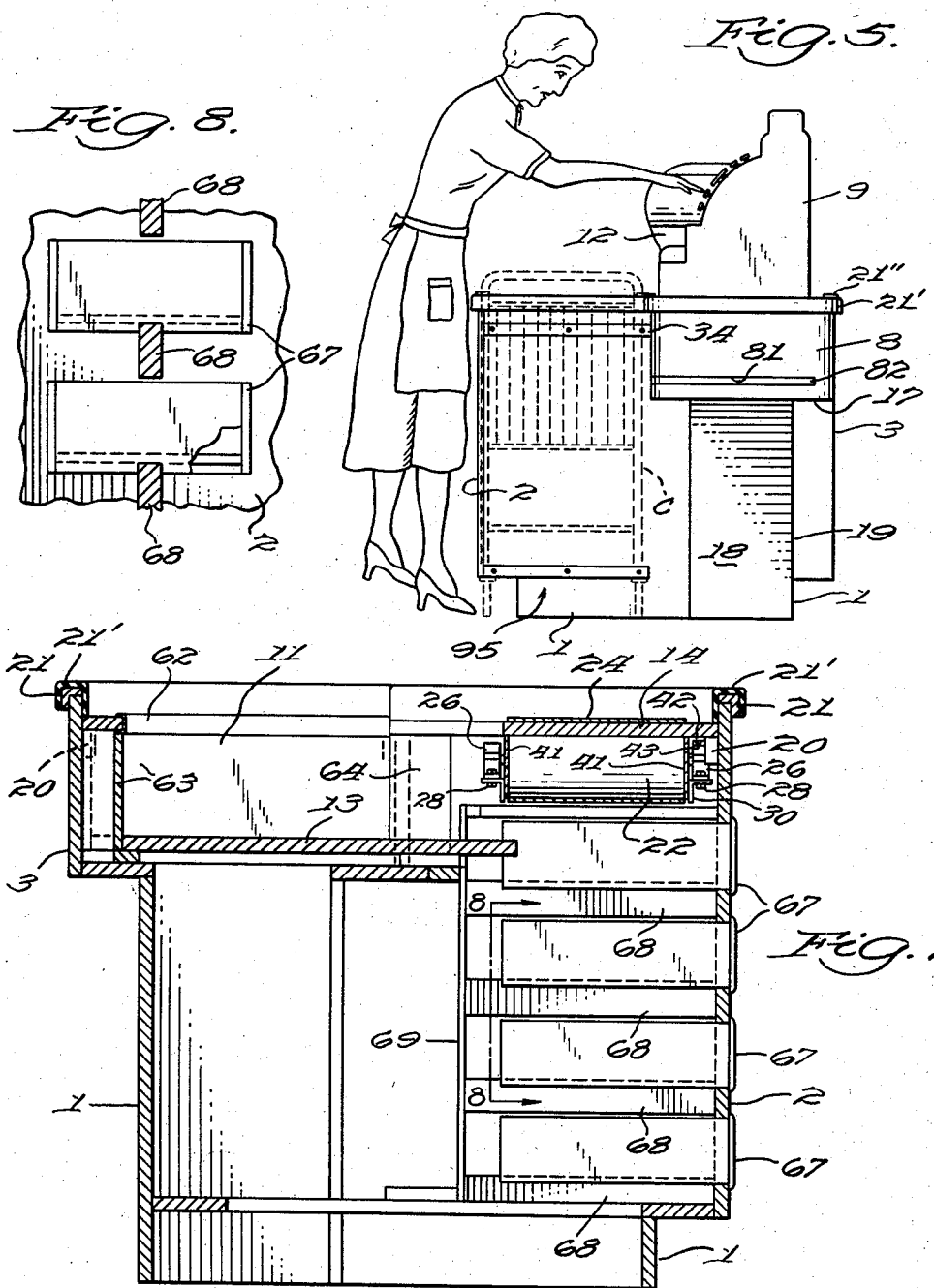
INVENTOR.
Albert E. Roy.
BY Harold J. LeVesconte
Atty.

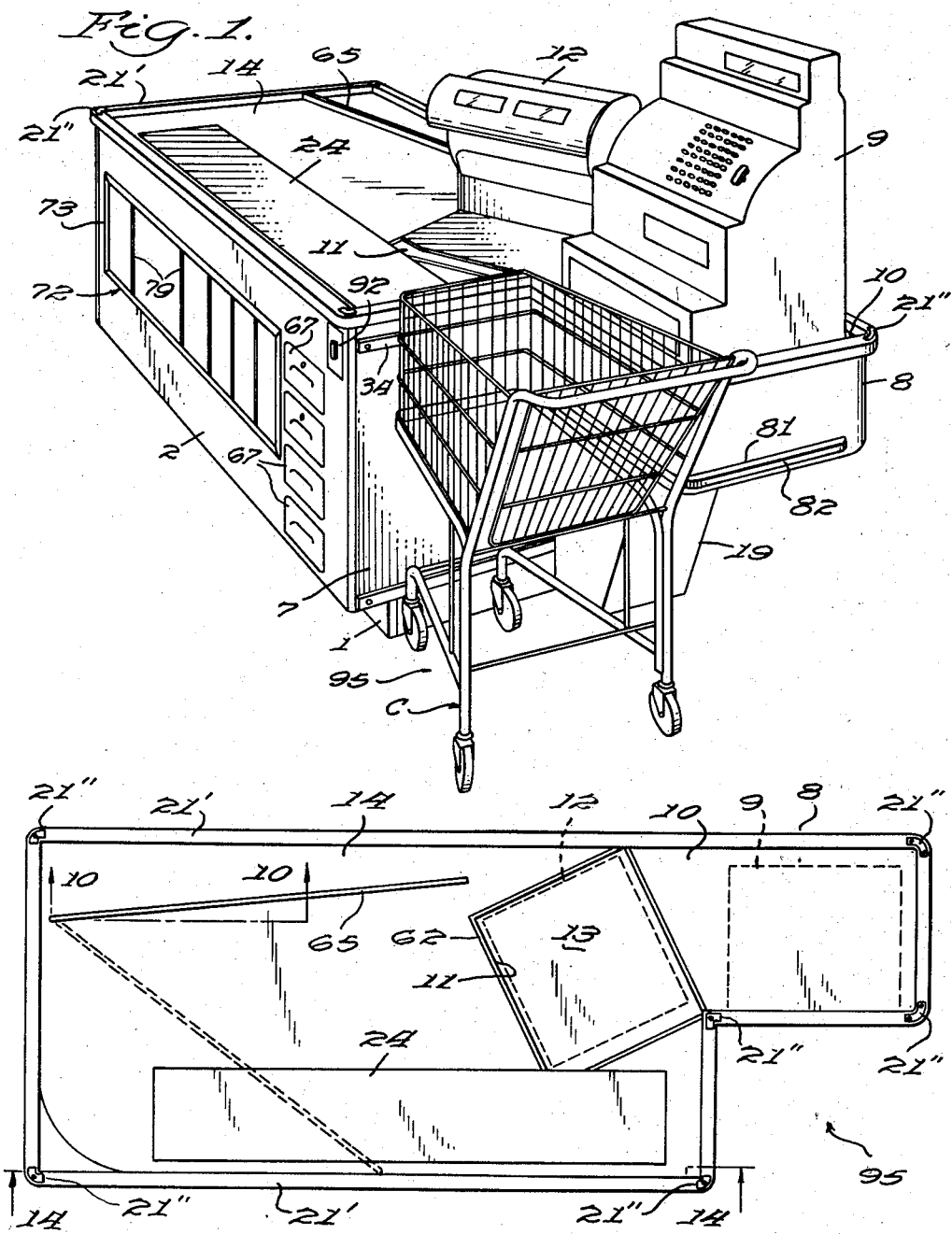

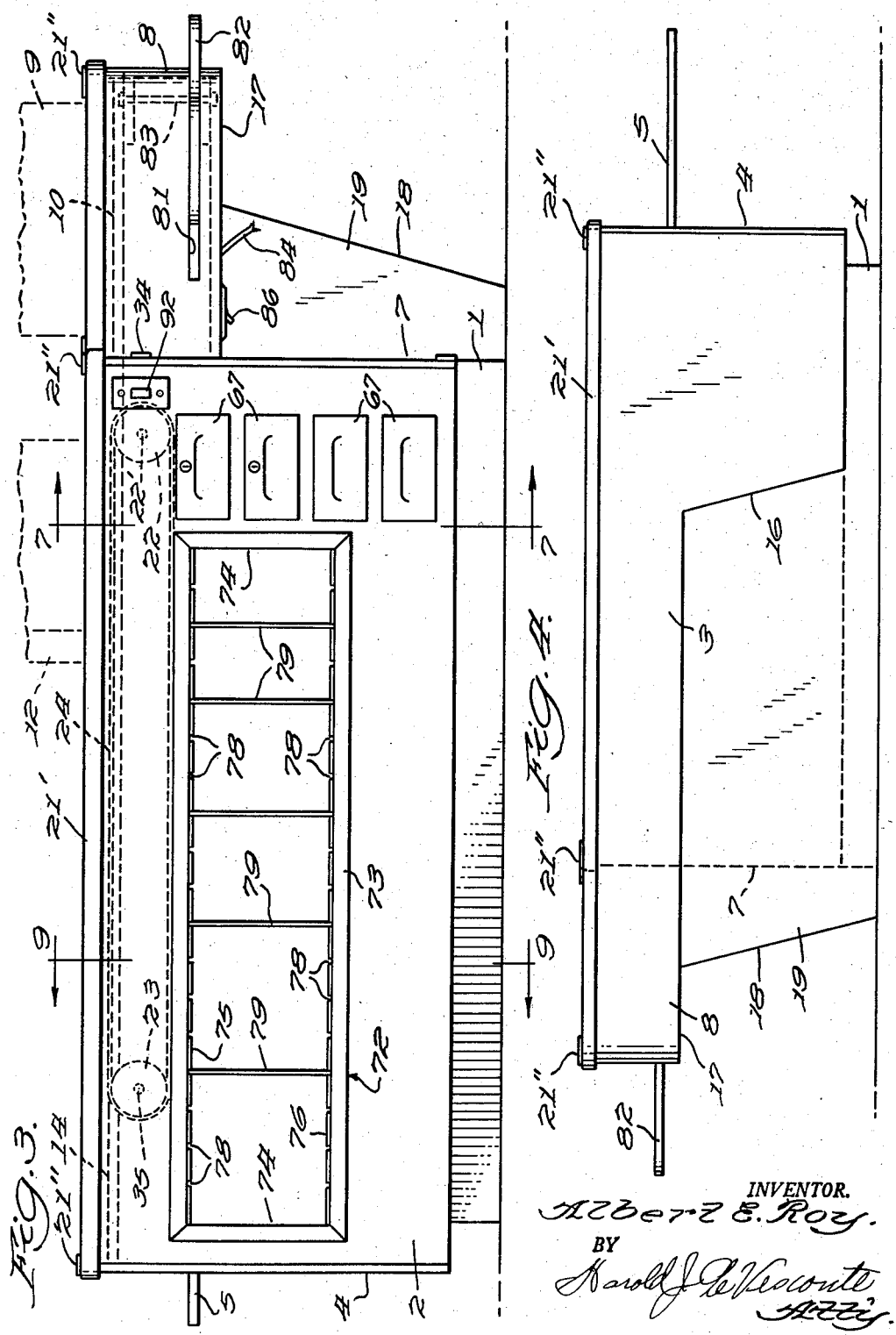

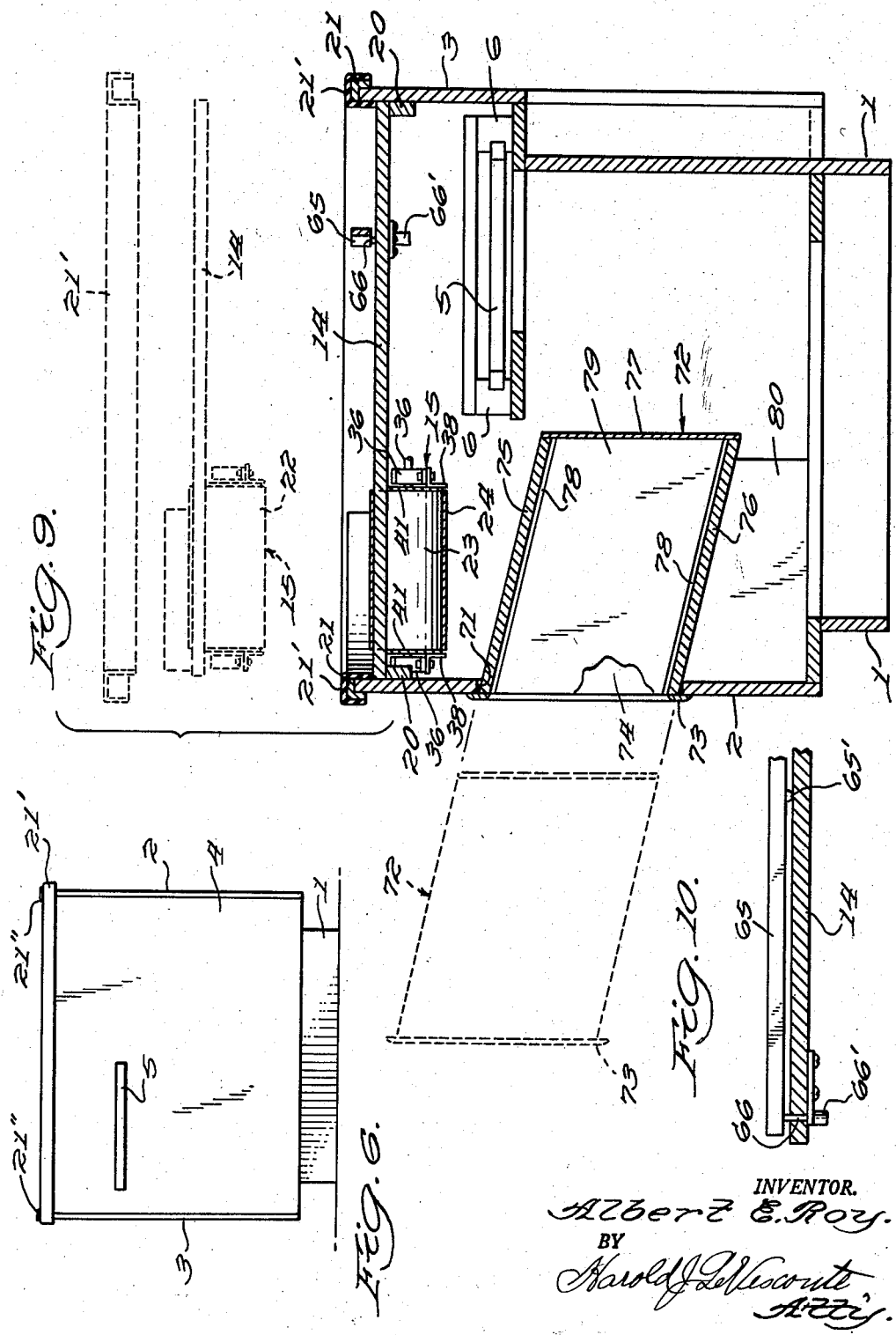

April 28, 1959     A. E. ROY     2,884,094
CHECKSTAND
Filed July 31, 1956     6 Sheets-Sheet 5
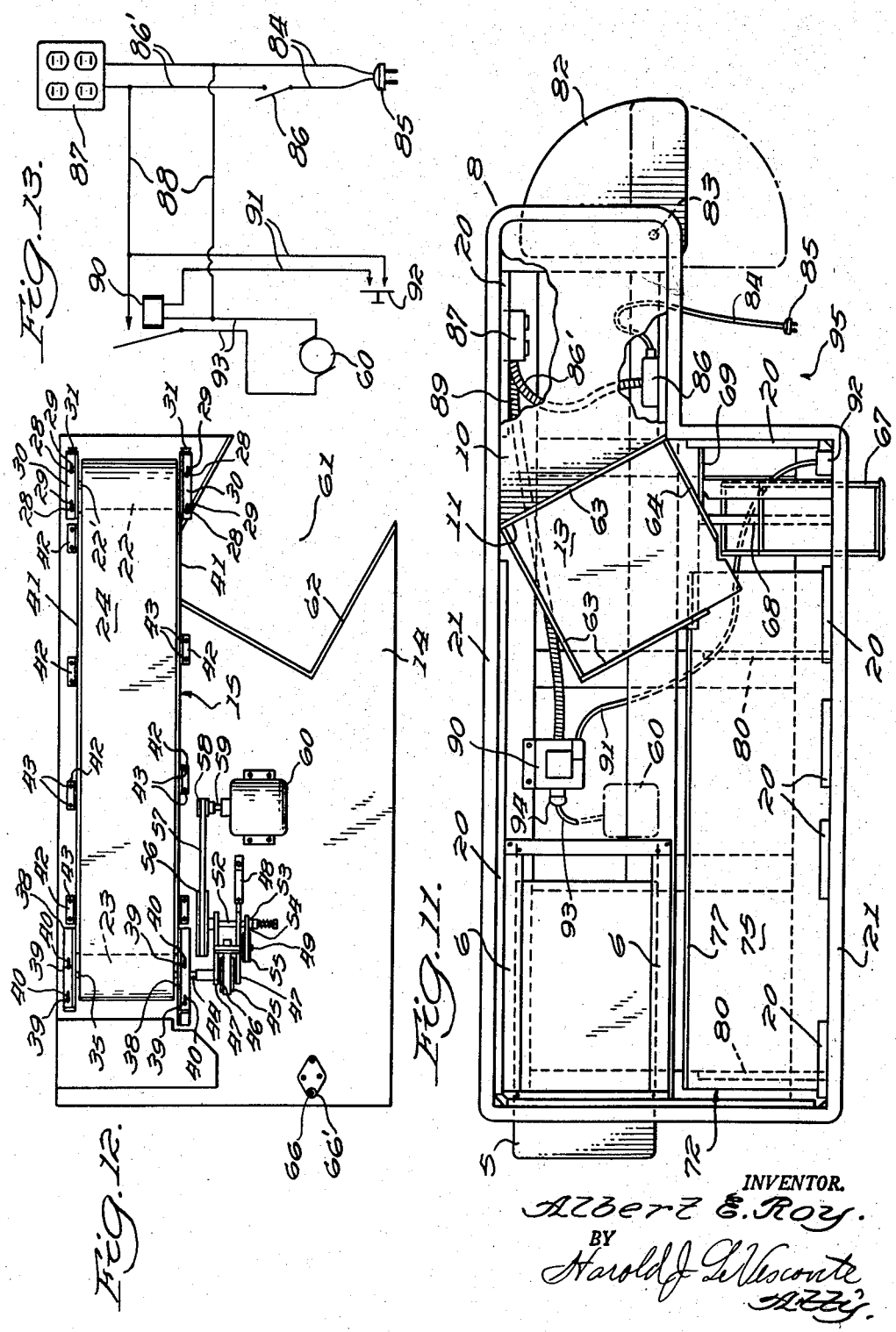
INVENTOR.
Albert E. Roy.
BY Harold J. LeVisconte
Atty.

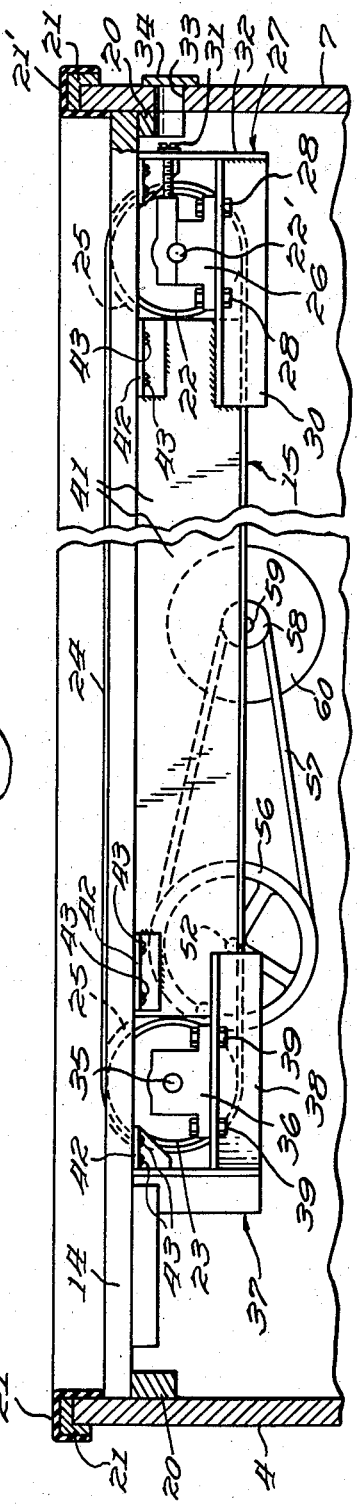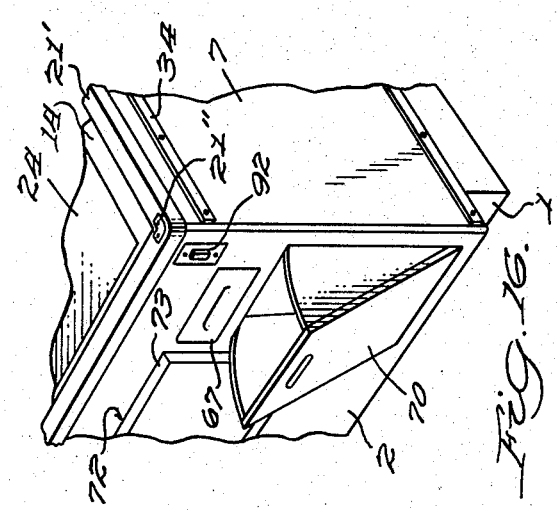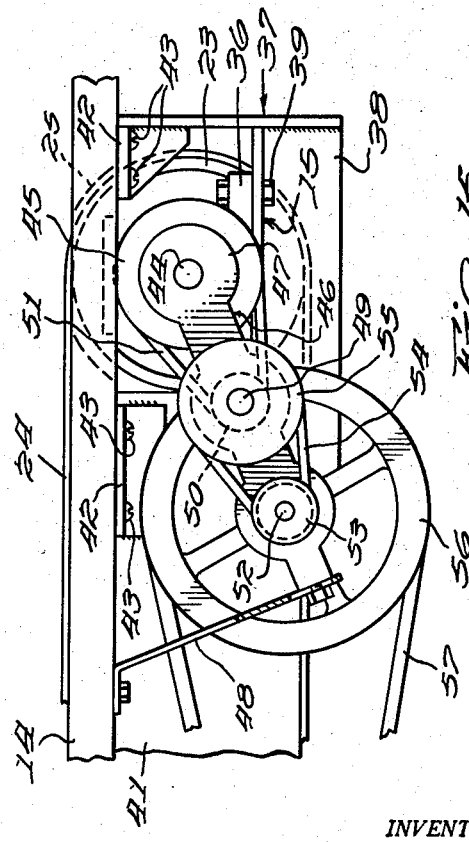

United States Patent Office 2,884,094
Patented Apr. 28, 1959

2,884,094

CHECKSTAND

Albert E. Roy, Blue Jay, Calif., assignor to Deer Lodge Manufacturing Company, San Bernardino, Calif., a corporation of California Application July 31, 1956, Serial No. 601,186

10 Claims. (Cl. 186—1)

This invention relates to store equipment and particularly to an improved form of checkstand for self service food markets.

The principal object of the invention is to provide a checkstand of the above character which is designed and arranged to facilitate the removal of the merchandise selected by the customer from the shopping cart to the point of bagging with the accompanying checking of the merchandise items on the cash register and weighing scale with minimum effort on the part of the checker and with resultant reduction of the time required for such operation.

Another object of the invention is to provide a checkstand having a conveyor means for moving the checked items to the point of bagging in which the conveyor is mounted for quick removal and replacement in the event of mechanical trouble.

A further object of the invention is to provide a checkstand having a bay or clearance space formed therein for placement of the shopping cart of merchandise in close proximity to the cash register, weighing scale and conveyor means whereby the checker can check the merchandise on the scale (if required), record the values on the cash register and place the items on a conveyor means with a minimum of effort and distance to be reached.

Still another object of the invention is to provide a checkstand in which all of the foregoing objectives are realized in practice, which is both sturdy and simple in construction, and which presents an attractive appearance.

With the foregoing objects in view, together with such additional objects and advantages as may subsequently appear, the invention resides in the parts, and in the construction, combination and arrangement of parts described, by way of example, in the following specification of a presently preferred form of the invention; reference being had to the accompanying drawings which form a part of said specification and in which drawings:

Fig. 1 is a perspective view of a checkstand embodying the present invention; the view being taken diagonally downward from a point to the right of the position occupied by the checker, Fig. 2 is a top plan view, Fig. 3 is a front elevation, Fig. 4 is a rear elevation on a reduced scale, Fig. 5 is a right hand elevation also indicating the positions occupied by the shopping cart and the checker, Fig. 6 is a left hand end elevation, Fig. 7 is an enlarged scale sectional view taken on the line 7—7 of Fig. 3, Fig. 8 is a further enlarged scale, fragmentary, sectional view taken on the line 8—8 of Fig. 7, Fig. 9 is an enlarged scale, sectional view taken on the line 9—9 of Fig. 3 additionally indicating in dotted lines the manner in which certain of the component parts are removed from the body of the checkstand, Fig. 10 is a fragmentary, sectional view taken on the line 10—10 of Fig. 2, Fig. 11 is a top plan view of the checkstand with the counter top element removed therefrom and certain other portions of the top broken away to show interior construction, Fig. 12 is a bottom plan view of the counter top element and the conveyor apparatus carried thereby, Fig. 13 is a circuit diagram of the electrical connections and supply associated with the checkstand, Fig. 14 is a fragmentary, enlarged scale, sectional view taken on the line 14—14 of Fig. 2 showing details of the conveyor mounting and construction; an intermediate portion of the figure being omitted to conserve drawing space, Fig. 15 is a side elevation of the conveyor drive speed reduction gearing, and Fig. 16 is a perspective view showing a modification of the utilization of drawer space by employing a portion thereof as a waste bin.

Referring to the drawings, the illustrated embodiment of the invention comprises a generally rectangular cabinet or counter including a base portion 1 of generally smaller dimensions than the remainder of the structure to allow persons to stand close to the sides of the structure. The structure includes a front side 2, a rear side 3, a left hand or bagging end 4 having a bag supporting board 5 slidably mounted in guides 6, a right hand end 7 including an outwardly extending overhanging portion 8 on which the cash register 9 is supported, and a top surface composed of a fixed portion 10 having a well 11 in which the base of a scale 12 is positioned on a platform 13; said fixed portion also forming the top of the overhanging portion 8, and a removable portion 14 on the under side of which a conveyor unit 15 is mounted.

The inset base portion of the base 1 extends along the front face, the left hand end and the left hand portion of the rear face in a common plane slightly above the floor line, thence at the rear face it extends diagonally upwardly and toward the right hand end as at 16 to the level of the under face 17 of the overhanging portion 8, and thence extends from the floor line at that level to the outer end face 18 of the bracket portion 19 disposed beneath the overhanging portion 8; said end face having the same angle as the diagonal portion 16 for the sake of appearance. Preferably, all exterior surfaces of the checkstand are made of plywood covered with a suitable plastic coating or veneer of a color or colors which complement the decorative plan or scheme of the market but other materials such as sheet metal may be used where it is found economical to do so.

The inner faces of the front and rear sides and of both ends are provided with a series of stop members 20 disposed slightly below the upper edges thereof (see Figs. 7, 10, 11 and 14) on which the removable top 14 rests with the upper surface thereof disposed slightly below the upper edge of the checkstand and in the same plane as the fixed top portion 10 whereby the portions of the side and ends of the checkstand serve as rails to prevent merchandise from falling to the floor. The upper edges of the side and end members as well as the members forming the sides and end of the overhanging portion 8 are capped by an externally disposed angle molding 21 and covered by a removable inverted channel member 21' formed of lengths of suitable rubber molding joined at the corners by angle plates 21" which channel member both provides a neat finish for the upper edges of the check stand and serves as well to protect the merchandise and the checkstand from being marred. When it is desired to remove the top member 14, the channel member is first removed as indicated in Fig. 9.

Mounted on the under side of the removable top member 14 is a belt conveyor unit comprising an idler pulley 22 disposed adjacent the right hand end of the member and a driving pulley 23 disposed adjacent the left hand end of the top member 14; said pulleys having a belt 24 trained thereover and being disposed in openings 25, 25 formed in the top member and with the top run of the belt riding on the top surface of the top member 14 and disposed parallel and adjacent to the front side of the checkstand. The conveyor frame comprises oppositely identical assemblies at either side thereof and a description of one will serve for both. The idler pulley is mounted on a shaft 22' journaled in pillow blocks 26 mounted on an end frame 27 by bolts 28 extending through slots 29 in the lower member 30 of the end frame 27. Screws 31 extending through the end member 32 of the end frame 27 threadedly engage the pillow blocks 26 and provide means whereby the pillow blocks may be adjusted longitudinally of the conveyor unit for achieving the desired degree of tightness of belt; access to the screws 31 being had through holes 33 in the end wall element 7 of the checkstand which holes are normally covered by a removable cover strip 34. The driving pulley 23 is mounted on a shaft 35 journalled in pillow blocks 36 carried by an end frame assembly 37 and adjustably secured to the lower member 38 thereof by bolts 39 extending through slots 40 in the lower member 38. Longitudinally extending members 41, 41 extend between and interconnect each pair of end frames comprising one end frame 27 and one end frame 37. Brackets 42 attached to the upper edges of the end frames and the members 41, 41 and screws 43 passing through said brackets connect the conveyor assembly to the under side of the removable top 14.

The driving means for the conveyor include an extension 44 of the shaft 35 beyond the rearmost of the pillow blocks 36 carrying a driven pulley 45 and also carrying a yoke member 46 having arms 47 journalled on the shaft portion 44 at each side of the pulley 45. The yoke member extends in the general direction of the idler pulley and terminates in an end secured to a bracket arm 48 depending from the under side of the table top portion 14. Intermediate its ends, the yoke carries a first countershaft 49 having a small pulley 50 connected by a belt 51 to the driven pulley 45 and a second countershaft 52 having a small pulley 53 connected by a belt 54 to a larger pulley 55 on the first countershaft 49. The second countershaft 52 also carries a large pulley 56 connected by a belt 57 to a smaller pulley 58 on the shaft 59 of an electric motor 60 secured to the underside of the top portion 14. Thus through the above recited series of pulleys and belts a three step speed reduction is achieved resulting in a desired lineal rate of travel for the conveyor belt.

The removable top 14 is provided with an angularly disposed clearance cut 61 surrounding the scale receiving well; the edges of said clearance being provided with a molding 62 and being supported by the walls 63 forming the rear end and sides of the said well. Additionally, the well is bordered by a front wall 64 which is interrupted by intersection with the conveyor unit as best shown in Fig. 2. Thus, should the conveyor require servicing, the channel member 21' is removed and the top portion 14 with the attached conveyor is then lifted out as a unit and repaired on the spot or replaced with another top and conveyor unit. Since interchange requires only a few minutes, the preferred mode is to have a spare top and conveyor unit available with each installation of checkstands; the average market for which these checkstands are designed seldom having less than, say, three checkstands and more generally having six to twenty checkstands.

The removable top 14 is further provided with a diverter element comprising a bar 65 having a vertical shaft 66 fixed to one end of the bar and journalled in a bearing 66' carried by the under face of the top element 14 adjacent the left hand end of the checkstand at a point spaced inwardly of the rear of the checkstand; the bar extending parallel to the upper surface of the stop member and having a length which when the bar is swung on its said pivotal mounting will just clear the scale well. The free end of the bar is normally swung toward the rear face of the checkstand as shown in full lines, but if it becomes necessary to separate the goods of successive customers, the checker or the person bagging the purchases at the left hand end can swing the bar diagonally across the conveyor as indicated in dotted lines in Fig. 2 with resultant lateral diverting of the items placed on the belt by the checker; the projection 65' at the bottom edge of the free end of the bar serving to hold it out of contact with the belt.

The front face 2 of the checkstand at the right hand end thereof may be provided with a series of storage drawers 67; said drawers being slidable in openings cut in the panel forming the front face and on center guide members 68 fixed to the front panel and supported at their rear ends on a vertically disposed member 69 within the checkstand; said drawers carrying the personal belongings of the checker as well as certain supplies such as rubber stamps, cash register tapes, and the like. Alternatively, instead of the four drawers shown in Fig. 7, there may be only a single drawer employed as shown in Fig. 16 with the space for the lower three drawers occupied by a tilt-out trash bin 70.

To the left of the drawers and trash bin above referred to, the front panel is provided with a large rectangular opening 71 in which a bag rack assembly 72 is removably disposed. The bag rack comprises a flange portion 73 engaging the outer face of the front panel around the opening 71, vertically disposed end members 74 and downwardly, rearwardly sloping top and bottom members 75 and 76 and a rear end wall 77; the top and bottom members on their inner faces being provided with mating series of grooves 78 for reception of removable partitions 79 by which the interior of the rack may be divided into compartments of varying width for holding various sizes of bags in any desired arrangement. The checkstand interiorly of the opening 71 adjacent each end thereof is provided with supports 80, 80 having rearwardly and downwardly sloping top faces on which the bag rack rests when placed in the checkstand. By this expedient, the weight of the bag rack maintains it in position without need for other securing means and at the same time it provides the rearwardly and downwardly sloping inner surface for keeping the bags stored therein in position in the various compartments. When access to the interior of the checkstand is desired, the removal of the bag rack provides a large opening for that purpose.

The lower portion of the end face of the overhanging portion 8 is provided with a horizontal slot 81 in which a bagging shelf 82 is mounted; said shelf being substantially of quarter circle configuration in plan and being mounted on a vertical pivot pin 83 disposed at the front corner of said overhanging portion. The shelf is thus ordinarily housed within the overhanging portion, but when occasion requires, as in instances in which a customer has only a few items and the person bagging purchases at the left hand end of the checkstand is busy, the checker can pull out the shelf and bag the items for another customer to keep the line of customers moving with the least possible waiting time. Also when a customer has only a few items and has not used a shopping cart, the shelf can be swung out for the convenience of the customer pending the checking out of that customer.

The electrical system of the checkstand comprises a conductor 84 having a plug 85 for connection with a source of energy; said conductor leading to a master switch 86 from which leads 86' extend to a receptacle 87 housed within the overhanging portion 8 and having sockets for connection of the conductors for the cash register and for the scale lighting. Leads 88 housed within a conduit 89 thence lead through a starter switch unit 90 to the motor 60 and leads 91 extend from the starter switch 90 to a manual switch 92 on the front panel adjacent the upper right hand corner thereof for convenient operation by the checker in starting and stopping the conveyor. For convenience in removing the top 14 and the conveyor unit, the motor 60 is connected to the starter switch by a conductor 93 having a plug 94 engaging a socket on the starter switch 90.

Referring particularly to Figs. 1, 2 and 5, it will be noted that the overhanging portion 8 and the right hand end of the checkstand form a bay or recess 95 into which a shopping cart C may be placed. The contents of the shopping cart are thus positioned directly in front of the checker who can with a minimum amount of movement pick up the items from the cart with her left hand, ring up the amount on the register with her right hand and place the items on the belt to be transported to the person doing the bagging. If the item is one which must be weighed, the scale is positioned for easy reach by the checker and for easy observation of the price as computed by the scale and thence to be placed on the conveyor belt. It is this arrangement of cart, scale, and conveyor within an area covered by normal movement of the left hand of the checker while operating the cash register with her right hand that reduces the time required as well as the effort required to check out the purchases of a customer. Upon completion of the checking out, the cart is moved out of the bay 95 and the next cart brought into position. As has been described above, provision is made for the convenient checking out and bagging of the purchases of customers by the checker at the checking out station where such action is desirable for any purpose. Additionally, the positioning of the top member below the top edge of the checkstand provides a rim which prevents the items from falling to the floor.

The checkstand is of simple construction and provision is made for prompt servicing in the event of failure or other trouble with the conveyor unit. The preferred mode of construction permits the manufacture with any desired exterior color or colors to conform with the decoration of the market without interference with the orderly production of the units since the plywood sheets from which the exterior panels or surfaces are formed can be provided with the plastic veneer surface desired before they are cut up to form the various component parts.

While the foregoing specification discloses a presently preferred embodiment of the invention, it is not to be inferred that the invention is limited to the form disclosed, and it will be understood that the invention embraces all such changes and modifications in the parts and in the construction, combination and arrangement of parts as shall come within the purview of the appended claims.

I claim:

1. In a checkstand, a rectangular body structure having a removable top portion and having an overhanging, bracket like portion at one end thereof; said overhanging portion being of less width than said body structure and having the rear face thereof substantially flush with the rear face of said body structure with resultant formation of a bay bounded by the front face of said overhanging portion and the adjacent end of said body structure in which a shopping cart is received; said overhanging portion affording support for a cash register mounted thereon with the operating face of the register facing said bay for operation by a checker standing in front of the shopping cart and reaching across the cart to operate the register; said body structure also affording support for a weighing scale positioned adjacent to the rear side of said body structure and adjacent to the cash register and disposed at an acute angle relative to the cash register whereby the dial of the scale may be directly observed by the checker when standing in the said position in front of the cash register, and a conveyor means incorporated in the top surface of said body structure and extending adjacent to the front side thereof past the front edge of the scale platform and substantially the entire length of said body structure.

2. A checkstand as claimed in claim 1 in which said conveyor means is mounted on said removable top portion of said body structure and is removable and replaceable as a unit with said removable top portion.

3. A checkstand as claimed in claim 1 in which said top surface of said portion is disposed below the top edges of the sides of said body structure with resultant formation by said sides of package retaining walls bounding said top surface.

4. A checkstand as claimed in claim 1 in which said scale supporting portion is disposed at a lower level than the top surface of said body structure with resultant positioning of the scale platform substantially at the level of said top surface.

5. In a checkstand, a body structure forming a counter of rectangular form in plan, having a cash register support extending from one end thereof with the rear face of said support disposed substantially in the plane of the rear side of said body structure, said support being of less width than said body structure with resultant formation of a bay bounded in part by the front side of said support and the end of said body structure from which said support extends; means on said body structure for supporting a weighing scale with the platform of said scale disposed substantially flush with the top surface of said body structure; said scale being positioned adjacent the rear side of said body structure and to said cash register supporting portion and at an acute angle relative to the cash register affording direct observation of the scale dial by a checker standing in front of a shopping cart positioned in said bay, and conveyor means including a belt having a run disposed closely above the top surface of said body structure and extending adjacent to the front side thereof from a point adjacent said bay past the scale platform and thence to the opposite end of said body structure.

6. A checkstand as claimed in claim 5 in which the top of said body structure from said scale supporting portion to the opposite end of said body structure comprises an element removable from said body structure and in which said conveyor means is mounted on the under side of said element and removable as a unit therewith.

7. A checkstand as claimed in claim 5 in which said conveyor means comprises a conveyor frame supporting a pair of pulleys secured to the under side of said removable element; said element having openings therethrough through which said pulleys extend with the surfaces thereof substantially in the plane of the top surface of said element; said belt being trained over said pulleys with the under surface of the top run thereof riding on said top surface, and a driving motor operatively connected to one of said conveyor pulleys and mounted on the under side of said removable top element.

8. In a checkstand, a body structure forming a generally rectangular counter, a support for a cash register extending from one end of said body structure and having the rear face disposed substantially flush with the rear face of said body structure; said support being of less width than said body structure with resultant formation of a bay for reception of a shopping cart at the front of said support, a cash register mounted on said support with the operating side thereof disposed at the front of said support for access by a checker standing in front of a shopping cart disposed in said bay and reaching across the shopping cart, a weighing scale mounted on the top of said body structure adjacent to the rear side thereof and to said cash register; said scale being disposed at an acute angle relative to the cash register affording direct observation of the scale dial by the checker when occupying the said position, and conveyor means extending parallel and adjacent to the front side of said body structure and extending substantially from end to end of said body structure.

9. A checkstand as claimed in claim 8 in which said conveyor means comprises a belt conveyor and in which the top of said body structure includes a removable element comprising the major portion of the top surface of said body structure and on which said conveyor means and the driving means therefor is mounted on said removable element.

10. In a checkstand, a rectanguar body structure having an overhanging, bracket like portion at one end thereof; said portion being of less width than said body structure and having the rear face thereof substantially flush with the rear face of said body structure with resultant formation of a bay bounded by the front face of said overhanging portion and the adjacent end of said body structure in which a shopping cart is received; said overhanging portion affording support for a cash register mounted thereon with the operating face of the register facing said bay for operating by a checker standing in front of the shopping cart and reaching across to operate the register; said body structure also affording support for a weighing scale positioned adjacent to the rear side of said body structure and adjacent to the cash register and disposed at an angle whereby the dial of the scale may be directly observed by the checker when standing in the said position in front of the cash register, a conveyor means incorporated in the top surface of said body structure and extending adjacent to the front side thereof for substantially the entire length of said body structure, a first bagging shelf mounted for movement into and out of the end of said body structure remote from said cash register support, and a second bagging shelf movable into and out of the end of said cash register support.

References Cited in the file of this patent

UNITED STATES PATENTS

| | | |
|---|---|---|
| 2,237,080 | Muse | Apr. 1, 1941 |
| 2,286,548 | Jackson | June 16, 1942 |
| 2,569,711 | Foster | Oct. 2, 1951 |
| 2,631,689 | Rubaloff | Mar. 17, 1953 |
| 2,776,730 | Crawford | Jan. 8, 1957 |